US012502226B2

(12) United States Patent
Cathier et al.

(10) Patent No.: US 12,502,226 B2
(45) Date of Patent: Dec. 23, 2025

(54) NAVIGATION ASSISTANCE SYSTEM

(71) Applicant: KONINKLIJKE PHILIPS N.V., Eindhoven (NL)

(72) Inventors: Pascal Yves François Cathier, Asnières-sur-seine (FR); Raoul Florent, Ville d'Avray (FR); Hernán Guillermo Morales Varela, Suresnes (FR)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 1204 days.

(21) Appl. No.: 15/774,126

(22) PCT Filed: Dec. 15, 2016

(86) PCT No.: PCT/EP2016/081093
§ 371 (c)(1),
(2) Date: May 7, 2018

(87) PCT Pub. No.: WO2017/102898
PCT Pub. Date: Jun. 22, 2017

(65) Prior Publication Data
US 2018/0318016 A1    Nov. 8, 2018

(30) Foreign Application Priority Data

Dec. 15, 2015   (EP) ..................................... 15307008

(51) Int. Cl.
*A61B 5/05*         (2021.01)
*A61B 17/00*        (2006.01)
(Continued)

(52) U.S. Cl.
CPC ........ *A61B 34/20* (2016.02); *A61B 17/00234* (2013.01); *A61B 34/10* (2016.02);
(Continued)

(58) Field of Classification Search
None
See application file for complete search history.

(56) References Cited

U.S. PATENT DOCUMENTS 8,460,236 B2    6/2013    Roelle et al.
8,672,837 B2    3/2014    Roelle et al.
(Continued)

FOREIGN PATENT DOCUMENTS

WO    2015088961 A1    6/2015

*Primary Examiner* — Joel F Brutus

(57) ABSTRACT

The invention relates to a navigation assistance system for assisting in navigating an interventional instrument (10) within a subject during an interventional procedure. Based on a provided current position and shape of the interventional instrument, a provided target position defining the position of a target (45) to which the interventional instrument is to be moved and provided configuration information being indicative of possible configurations of the interventional instrument a possible path (50) is determined, which allows the interventional instrument to reach the target. The determined possible path and preferentially also the current position and shape of the interventional instrument and the target position can be shown on a display in realtime, while a physician moves the interventional instrument, thereby assisting the physician in navigating the interventional instrument.

20 Claims, 4 Drawing Sheets

(51) Int. Cl.
*A61B 34/10* (2016.01)
*A61B 34/20* (2016.01)
A61B 34/00 (2016.01)
A61B 90/00 (2016.01)

(52) U.S. Cl.
CPC ... *A61B 2017/003* (2013.01); *A61B 2034/102* (2016.02); *A61B 2034/107* (2016.02); *A61B 2034/2061* (2016.02); *A61B 2034/254* (2016.02); *A61B 2034/256* (2016.02); *A61B 2090/376* (2016.02)

(56) References Cited

U.S. PATENT DOCUMENTS

| | | |
|---|---|---|
| 9,057,600 B2 | 6/2015 | Walker et al. |
| 2007/0197896 A1 | 8/2007 | Moll et al. |
| 2008/0183073 A1 | 7/2008 | Higgins et al. |
| 2012/0289843 A1* | 11/2012 | Chopra ............... A61B 1/0051 600/508 |
| 2012/0296196 A1* | 11/2012 | Boese .................. A61B 6/487 600/411 |
| 2013/0204124 A1 | 8/2013 | Duindam et al. |
| 2013/0303892 A1 | 11/2013 | Zhao et al. |
| 2014/0187949 A1* | 7/2014 | Zhao ................... A61B 8/085 600/443 |
| 2014/0188440 A1 | 7/2014 | Donhowe et al. |
| 2014/0243660 A1 | 8/2014 | Klinder et al. |
| 2014/0343416 A1 | 11/2014 | Panescu et al. |

\* cited by examiner

NAVIGATION ASSISTANCE SYSTEM

CROSS-REFERENCE TO PRIOR APPLICATIONS

This application is the U.S. National Phase application under 35 U.S.C. § 371 of International Application Serial No. PCT/EP2016/081093, filed on Dec. 15, 2016, which claims the benefit of European Patent Application No. 15307008.1, filed on Dec. 15, 2015. This application is hereby incorporated by reference herein.

FIELD OF THE INVENTION

The invention relates to a navigation assistance system, a navigation assistance method and a computer program for assisting in navigating an interventional instrument within a subject during an interventional procedure. The invention relates further to an interventional system comprising the navigation assistance system.

BACKGROUND OF THE INVENTION

When performing an interventional procedure, a physician generally needs to navigate an interventional instrument within a subject to a target. For instance, during a percutaneous mitral valve repair procedure the physician needs to navigate a catheter to the mitral valve. In order to assist the physician in navigating the interventional instrument to the target, usually two-dimensional x-ray projection images are acquired showing the current position of the interventional instrument and the heart with the mitral valve. However, accurately navigating the interventional instrument to the target by just using the two-dimensional x-ray projection images is very difficult for the physician.

US Patent Application 2014/0187949 describes a method receiving an image of an anatomic structure from an imaging probe extending from a catheter. The location data of a target structure identified in the image is received. The location data is transformed from the image frame of reference to the catheter frame of reference. The catheter frame of reference is registered to a patient frame of reference.

SUMMARY OF THE INVENTION

It is an object of the present invention to provide a navigation assistance system, a navigation assistance method and a computer program, which provide an improved assistance in navigating an interventional instrument within a subject. It is a further object of the present invention to provide an interventional system comprising the navigation assistance system.

In a first aspect of the present invention a navigation assistance system for assisting in navigating an interventional instrument within a subject during an interventional procedure is presented, wherein the navigation assistance system comprises:
a position and shape providing unit for providing the current position and shape of the interventional instrument,
a target position providing unit for providing a target position defining the position of a target to which the interventional instrument is to be moved,
a configuration information providing unit for providing configuration information being indicative of possible configurations of the interventional instrument,
a path determination unit for determining a possible path for the interventional instrument, which allows the interventional instrument to reach the target, based on the current position and shape of the interventional instrument, the target position and the configuration information, and
a display for displaying the determined possible path.

Since the determination of the possible path considers the current position and shape of the interventional instrument, wherein the determined possible path is shown on the display, a realtime possible path can be shown to the physician, while the physician moves the interventional instrument. Thus, for instance, the physician can move the interventional instrument such that it has different shapes and/or different positions, wherein for each shape and/or for each position, respectively, the display can show a possible path, which allows the interventional instrument to reach the target. The physician can then decide how the navigation of the interventional instrument should be continued based on the different possible paths determined while the interventional instrument had the different shapes and/or the different positions, respectively. This can lead to an improved assistance of the physician in navigating the interventional instrument within the subject.

The subject is preferentially a human patient. However, it can also be an animal. The interventional procedure is preferentially an invasive, especially a minimally invasive, interventional procedure.

The position and shape providing unit can be a receiving unit for receiving the current position and shape of the interventional instrument from a current position and shape measuring unit, wherein the position and shape providing unit can be adapted to provide the received, measured current position and shape of the interventional instrument. However, the position and shape providing unit can also be the position and shape measuring unit itself. In a preferred embodiment the position and shape providing unit is adapted to provide the current position and shape by optical shape sensing. The position and shape providing unit is preferentially adapted to provide the position and shape in three dimensions.

The target position providing unit can be adapted to receive the target position from another unit and to provide the received target position. The target position providing unit can also be a storing unit, in which the target position is stored already, wherein the target position providing unit can be adapted to provide the stored target position. Moreover, the target position providing unit can be adapted to determine the target position and to provide the determined target position. The target position providing unit can also be adapted to allow a user to input the target position and to provide the input target position. For instance, one or several images can be shown on the display, wherein the target position providing unit can be adapted to allow the user to indicate the target position on the one or several provided images on the display, in order to input the target position.

Preferentially, a position defines a location and optionally also an orientation, i.e. preferentially the target position defines the location of the target and optionally also its orientation. The target position is preferentially a three-dimensional position.

The provided current position and shape of the interventional instrument and the provided target position are registered to each other such that the spatial relationship between the current position and shape of the interventional instrument and the target position is known, i.e. they can be provided in a same frame of reference.

The path determination unit can be adapted to determine one or several possible paths, wherein correspondingly the display can be adapted to display one or several determined possible paths. The display can be adapted to show further elements. For instance, the display may also show the target position and/or the current position and shape of the interventional instrument and/or an image showing the anatomy of the subject and/or a model of the anatomy of the subject, wherein these elements may be shown in a single view with the one or several possible paths such that the spatial relations are visualized and shown to the physician.

The possible configurations are preferentially possible geometrical configurations defining, for instance, possible shapes, especially possible curvatures, of the interventional instrument. The interventional instrument is, for instance, a guidewire, a catheter, a needle, et cetera. The configuration information providing unit can also be a storing unit in which the configuration information is stored, wherein the configuration information providing unit can be adapted to provide the stored configuration information. The configuration information providing unit can also be adapted to receive the configuration information from another unit and to provide the received configuration information. Moreover, the configuration information providing unit can be adapted to determine the configuration information and to provide the determined configuration information.

In an embodiment the configuration information providing unit is adapted to determine the configuration information based on current positions and shapes of the interventional instrument, which are provided by the position and shape providing unit while the interventional instrument is moved, and to provide the determined configuration information. Thus, possible configurations of the interventional instrument may be recorded, while the interventional instrument is used, wherein these recorded configurations can be utilized for determining the possible configurations. In an embodiment the configuration information providing unit may be adapted to determine the recorded configurations as the possible configurations. The configuration information providing unit can be adapted to determine additional possible configurations based on the recorded configurations, for instance, by interpolating between the recorded configurations. These determined possible configurations can then be used, besides other information, for determining the possible path. This allows determining the possible path, even if initially the configuration information is not known for the interventional instrument.

The navigation assistance system may comprise an anatomical element indicator providing unit for providing an anatomical element indicator indicating an anatomical element and an image providing unit for providing an image of the subject showing the indicated anatomical element, wherein the target position providing unit is adapted to determine the target position based on the shown anatomical element and the provided image and to provide the determined target position. The provided anatomical element indicator indicates, for instance, that a mitral valve is the target, whereupon the mitral valve is detected in the provided image, in order to determine its position. Thus, the target position may automatically be determined based on the provided anatomical element indicator and the provided image of the object. The target position providing unit is preferentially adapted to allow a user to modify and confirm the automatically determined target position, wherein the possible path may only be determined, after the user has confirmed the determined target position.

For instance, a three-dimensional image or several two-dimensional images may be provided, wherein the anatomical element may be segmented in the three-dimensional image or in the several two-dimensional images, in order to determine the target position. The images can be, for instance, x-ray projection images, ultrasound images, computed tomography images, magnetic resonance images, et cetera. If several x-ray projection images are provided, in each of these images the indicated anatomical element may be segmented, in order to determine the two-dimensional positions of the anatomical element in the different two-dimensional x-ray projection images, wherein these two-dimensional positions can be used together with the respective acquisition geometry used for acquiring the respective two-dimensional x-ray projection image for determining the three-dimensional target position by using known techniques which may be based, for instance, on angulation.

The anatomical element indicator providing unit can be a storing unit, in which the indication which anatomical element should be the target is stored, wherein the anatomical element indicator providing unit can be adapted to provide the stored anatomical element indicator. The anatomical element indicator providing unit can also be adapted to receive an indication, which anatomical element should be the target, from another unit and to provide the received indication. Moreover, the anatomical element indicator providing unit can comprise a user interface allowing a user to indicate which anatomical element should be the target, wherein this anatomical element can be indicated by the anatomical element indicator providing unit. For instance, it can be input by a physician that the anatomical element, i.e. the target element, is the mitral valve or another anatomical element.

The navigation assistance system can further comprise an interventional procedure indicator providing unit for providing an interventional procedure indicator indicating the interventional procedure to be performed and an assignments providing unit for providing assignments between interventional procedure indicators and anatomical element indicators indicating anatomical elements, wherein the anatomical element indicator providing unit is adapted to determine the anatomical element indicator based on the provided interventional procedure indicator and the provided assignments and to provide the determined anatomical element indicator. Thus, the anatomical element indicator, i.e. the indication of the target, may automatically be determined by the anatomical element indicator providing unit by using the provided interventional procedure indicator and the provided assignments.

The interventional procedure indicator providing unit can just be a storing unit, in which the interventional procedure indicator is stored, wherein the interventional procedure indicator providing unit can be adapted to provide the stored interventional procedure indicator. The interventional procedure indicator providing unit can also be a receiving unit for receiving the interventional procedure indicator, i.e. an indication indicating the interventional procedure to be performed, and to provide the received interventional procedure indicator. The interventional procedure indicator providing unit can also comprise a user interface allowing a user to indicate the desired interventional procedure, wherein the user-indicated interventional procedure can be indicated by the interventional procedure indicator providing unit. For instance, the interventional procedure indicator providing unit can be adapted to allow a user to indicate that a percutaneous mitral valve repair procedure should be performed.

The anatomical element indicator providing unit can provide one anatomical element indicator indicating one anatomical element, to which the interventional instrument is to be moved, or several anatomical element indicators indicating several anatomical elements to which the interventional instrument may be moved. In the latter case the target position providing unit may be adapted to determine several possible target positions based on the provided several anatomical element indicators and the provided image. The target position providing unit can further be adapted to allow a user to indicate which of the determined several possible target positions should be used for determining the possible path. It is also possible that for each determined target position a respective possible path is determined.

The assignments providing unit can provide assignments between a respective single interventional procedure indicator indicating an interventional procedure and a respective single anatomical element indicator indicating an anatomical element to which the interventional instrument is to be moved while performing the interventional procedure and/or between a respective single interventional procedure indicator indicating an interventional procedure and several anatomical element indicators indicating anatomical elements to which the interventional instrument may be moved while performing the interventional procedure. In the latter case the target position providing unit may be adapted to determine several possible target positions based on the provided several anatomical element indicators and the provided image. The target position providing unit can further be adapted to allow a user to indicate which of the determined several possible target positions should be used for determining the possible path. It is also possible that for each determined target position a respective possible path is determined.

The navigation assistance system can further comprise an anatomical information providing unit for providing anatomical information being indicative of the anatomy within the subject, wherein the path determination unit can be adapted to determine the possible path also based on the anatomical information. This can lead to a further improved assistance in navigating the interventional instrument within the subject, especially if the anatomy of the subject confines the space between the current position of the interventional instrument and the target position.

It is further preferred that the navigation assistance system comprises an interventional procedure constraints providing unit for providing interventional procedure constraints to be considered while moving the interventional instrument during performing the interventional procedure, wherein the path determination unit is adapted to determine the possible path also based on the interventional procedure constraints. Also this can further improve the assistance in navigating the interventional instrument within the subject. For instance, if an interventional procedure requires that the interventional instrument approaches the target under a certain angle or under an angle within a certain range of angles, the path determination unit can be adapted to determine the possible path such that the target is reached under the required angle.

The interventional procedure constraints providing unit can be integrated with the anatomical element indicator providing unit, i.e. the interventional procedure constraints can include an indication which anatomical element should be the target while performing the interventional procedure.

In a preferred embodiment the path determination unit is adapted to determine a possible path, which allows the interventional instrument to reach a position being as close as possible to the target, based on the current position and shape of the interventional instrument, the target position and the possible configurations of the interventional instrument, if a possible path, which allows the interventional instrument to reach the target, is not determinable. Thus, a possible path may be shown to the physician, even if the target cannot be reached by the interventional instrument starting from the current position and shape of the interventional instrument. The physician can then modify the position and/or shape of the interventional instrument, in order to obtain a possible path to the target. The path determination unit can also be adapted to indicate to the physician that a possible path, which allows the interventional instrument to reach the target, is not determinable. For instance, it may be indicated via the display that a possible path, which allows the interventional instrument to reach the target, is not determinable. In this case no possible path may be shown. However, it is also possible that in this case a possible path is shown, which allows the interventional instrument to reach a position being as close as possible to the target, wherein this possible path may have a specific appearance, in order to indicate that the possible path cannot be used for reaching the target. For instance, a possible path may have a first appearance, especially a first color like green, if the target is reachable by the possible path, and a possible path may have a second appearance, especially a second color like red, if the target is not reachable by the possible path.

The navigation assistance system is preferentially adapted to perform a percutaneous mitral valve repair procedure, wherein the target position providing unit is adapted to provide the position of the mitral valve as the target position. In particular, the percutaneous mitral valve repair procedure includes puncturing the interatrial septum at a puncture location, in order to allow the interventional instrument to be introduced into the left atrium of the heart of the subject, wherein the path determination unit is adapted to determine a possible path for reaching the mitral valve, when a distal tip of the interventional instrument is located at a location on the interatrial septum, at which the interatrial septum is intended to be punctured. Thus, before puncturing the interatrial septum it can be shown to the physician whether the mitral valve can be reached, thereby assisting the physician in finding an appropriate puncture location.

In another aspect of the present invention an interventional system for performing an interventional procedure is presented, wherein the interventional system comprises:
  an interventional instrument,
  a navigation assistance system for assisting in navigating the interventional instrument within a subject during the interventional procedure as described herein.

In a further aspect of the present invention a use of the navigation assistance system as described herein for finding a puncture location for a percutaneous mitral valve repair procedure is presented, wherein at the puncture location the interatrial septum is to be punctured, in order to allow the interventional instrument to be introduced into the left atrium of the heart of the subject, wherein the path determination unit is used to determine a possible path for reaching the mitral valve, when a distal tip of the interventional instrument is located at a location on the interatrial septum.

In another aspect of the present invention a navigation assistance method for assisting in navigating an interventional instrument within a subject during an interventional procedure is presented, wherein the navigation assistance method comprises:

providing the current position and shape of the interventional instrument by a position and shape providing unit, providing a target position defining the position of a target, to which the interventional instrument is to be moved, by a target position providing unit, providing configuration information being indicative of possible configurations of the interventional instrument by a configuration information providing unit, determining a possible path, which allows the interventional instrument to reach the target, based on the current position and shape of the interventional instrument, the target position and the configuration information by a path determination unit, displaying the determined possible path by a display.

In another aspect of the present invention a computer program for assisting in navigating an interventional instrument within a subject during an interventional procedure is presented, wherein the computer program comprises program code means for causing a navigation assistance system as described herein to carry out the navigation assistance method as described herein, when the computer program is run on the navigation assistance system.

It shall be understood that the navigation assistance system of claim 1, the interventional system of representative embodiments, the use of the navigation assistance system of representative embodiments, the navigation assistance method of representative embodiments, and the computer program of representative embodiments have similar and/or identical preferred embodiments, in particular, as defined in the dependent claims.

It shall be understood that a preferred embodiment of the present invention can also be any combination of the dependent claims or above embodiments with the respective independent claim.

These and other aspects of the invention will be apparent from and elucidated with reference to the embodiments described hereinafter.

DETAILED DESCRIPTION OF EMBODIMENTS

Figure 1:
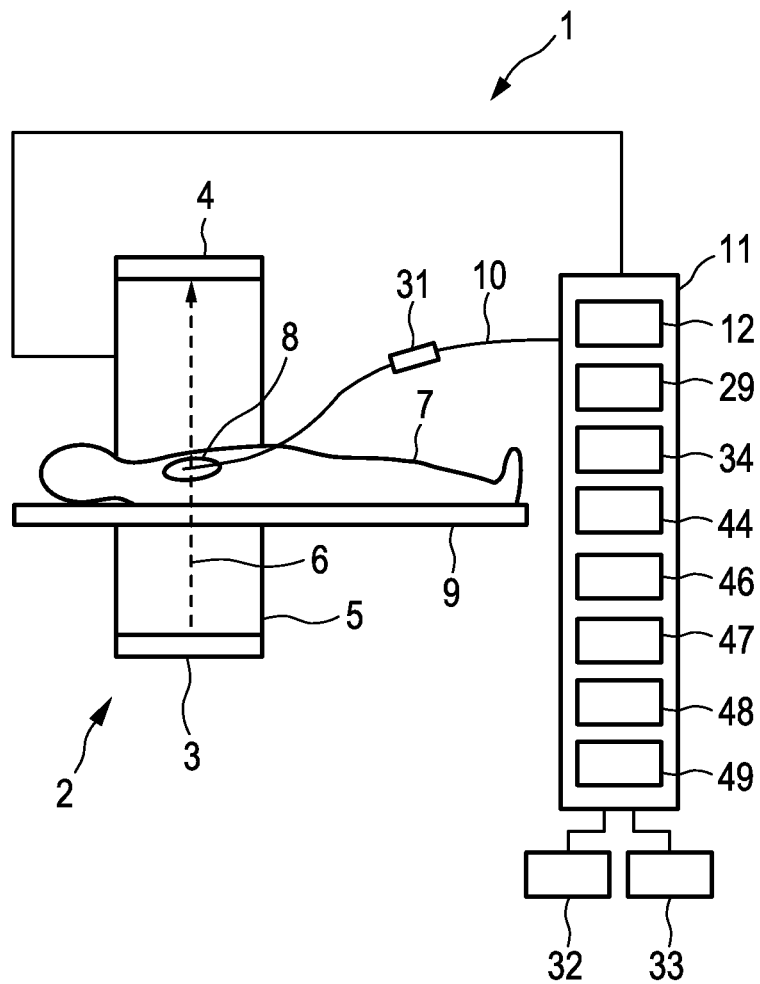
FIG. 1 shows schematically and exemplarily an embodiment of an interventional system for performing an interventional procedure.

FIG. 1 shows schematically and exemplarily an embodiment of an interventional system for performing an interventional procedure. The interventional system 1 comprises an interventional instrument 10 like a catheter, a guidewire, a needle, et cetera for being navigated to a target within the heart 8 of a person 7. The person 7 is arranged on a support means 9 like a table.

The interventional instrument 10 can comprise a handle 31 allowing a physician to navigate the interventional instrument 10 within the person 7, especially within the heart 8 of the person 7. The handle 31 can be adapted to allow the physician to push and pull the interventional instrument 10 and to deflect the distal tip of the interventional instrument 10, in order to move the distal tip of the interventional instrument 10 to the target.

The interventional system 1 further comprises an image providing unit 2 for providing an image of the person 7, especially of the heart 8 of the person 7. In this embodiment the image providing unit 2 is an x-ray C-arm system for acquiring two-dimensional x-ray projection images in different acquisition directions. The x-ray C-arm system comprises an x-ray source 3 for emitting x-rays 6 and a detector 4 for detecting the x-rays 6 after having traversed the person 7 and for generating a two-dimensional x-ray projection image based on the detected x-rays 6. The x-ray source 3 and the detector 4 are arranged at opposing of a C-arm 5 which is rotatable around the person 7, in order to provide the two-dimensional projection x-ray images in different acquisition directions. The generated two-dimensional x-ray projection images are provided to a control and processing device 11 and may be shown on a display 33.

The interventional system 1 further comprises a position and shape providing unit 12 for providing the current position and shape of the interventional instrument 10. In this embodiment the interventional instrument is enabled to allow for a determination of the position and shape of the interventional instrument 10 by optical shape sensing. In particular, the interventional instrument 10 comprises optical fibers with Bragg gratings and the position and shape providing unit 12 comprises a light source and a light detector for emitting light into the optical fibers and for detecting light received from the optical fibers, wherein the detected light is used for determining the position and shape of the interventional instrument 10, especially the position and shape of the distal end and of the interventional instrument 10.

Figure 2:
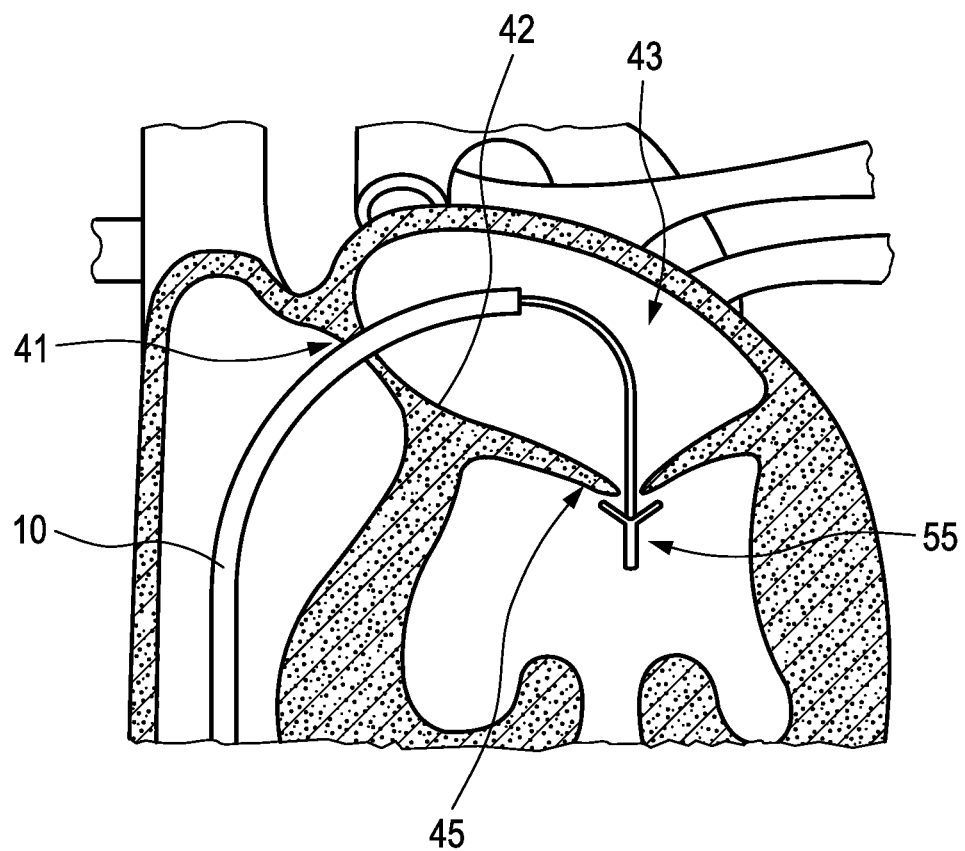
FIG. 2 illustrates schematically and exemplarily a use of a catheter during a mitral valve repair procedure within a heart of a person.

The interventional system 1 further comprises a target position providing unit 29 for providing a target position defining the position of a target to which the interventional instrument 10, i.e. the distal end of the interventional instrument 10, is to be moved. In this embodiment the target position is the position of the mitral valve 45 of the heart 8 schematically and exemplarily shown in FIG. 2, wherein FIG. 2 shows a situation in which the interventional instrument 10 has already been navigated to the mitral valve 45. In particular, the interventional system 1 can comprise an anatomical element indicator providing unit 44 for providing an anatomical element indicator indicating the anatomical element to which the interventional instrument 10 is to be moved and which is, in this embodiment, the mitral valve, wherein the target position providing unit 29 can be adapted to determine the target position based on the provided anatomical element indicator and images generated by the x-ray C-arm system 2 and to provide the determined target position. Thus, the anatomical element indicator providing unit 44 can be adapted to provide the information which anatomical element is the target, wherein this information can be used for finding this target in one or several images provided by the x-ray C-arm system, i.e. by the image providing unit 2. For instance, the mitral valve 45 can be segmented in different two-dimensional x-ray projection images, which have been acquired in different acquisition directions, in order to determine the two-dimensional location of the mitral valve 45 in the respective two-dimensional x-ray projection image, wherein these two-dimensional positions can be used together with the known acquisition directions for determining the three-dimensional target position of the mitral valve 45 by using known techniques which may be based, for instance, on angulation.

The anatomical element indicator providing unit 44 can just be a storing unit, in which the anatomical element indicator, i.e. information indicating the anatomical element, can be stored, wherein this stored indication can be provided. The anatomical element indicator providing unit 44 can also comprise a user interface allowing a user to input the desired anatomical element, i.e. allowing the user to indicate that, for instance, the mitral valve should be the target. The anatomical element indicator providing unit 44 can also be adapted to receive a) an interventional procedure indicator indicating the interventional procedure to be performed from an interventional procedure indicator providing unit 46 and b) assignments between interventional procedure indicators and anatomical element indicators indicating anatomical elements, to which the interventional instrument 10 is to be moved while performing the respective interventional procedure, from an assignment providing unit 47 and to determine the anatomical element indicator based on the provided interventional procedure indicator and the provided assignments and to provide the determined anatomical element indicator. Thus, the interventional procedure indicator providing unit 46 can provide an indication indicating the desired interventional procedure which should be performed, wherein this information can be used together with the assignments for determining an anatomical element indicator, i.e. for determining which anatomical element should be target. The target position providing unit 29 can then use this information regarding the desired anatomical element together with the images provided by the image providing unit 2 for determining the three-dimensional position of the target, i.e. of the mitral valve 45 in this embodiment.

The target position providing unit 29 can also be adapted to allow a user to input the target position and to provide the input target position. In particular, the target position providing unit 29 can comprise a user interface allowing a user like a physician to indicate the target, i.e. in this embodiment the mitral valve, in different two-dimensional x-ray projection images, in order to indicate the two-dimensional positions in the two-dimensional x-ray projection images of the target. The target position providing unit 29 can then determine the three-dimensional position of the target based on the indicated two-dimensional positions and the corresponding acquisition directions, which have been used for acquiring the respective two-dimensional x-ray projection images, by using known techniques which may be based on, for instance, angulation. Thus, the target position providing unit 29 can be adapted to allow the user to indirectly input the target position via indications on the two-dimensional x-ray projection images. The target position providing unit 29 can also be adapted to allow the user to directly input the three-dimensional position of the target. For instance, in an embodiment a three-dimensional image and/or a three-dimensional model of the heart may be provided, wherein the target position providing unit may be adapted to allow the user to indicate the target position in the three-dimensional image and/or in the three-dimensional model.

The interventional system 1 further comprises a configuration information providing unit 34 for providing configuration information being indicative of possible configurations of the interventional instrument 10. In this embodiment the configuration information providing unit 34 is adapted to provide possible geometrical configurations defining, for instance, possible shapes of the interventional instrument 10. The possible configurations can be stored in the configuration information providing unit 34, wherein the configuration information providing unit 34 can be adapted to provide the stored configuration information. However, the configuration information providing unit 34 can also be adapted to determine the configuration information based on current positions and shapes of the interventional instrument provided by the position and shape providing unit 12 while the interventional instrument 10 is moved and to provide the determined configuration information. In particular, before performing the interventional procedure the physician or another user can be asked to modify the geometrical configuration of the interventional instrument, in particular, to modify the shape of the interventional instrument, in different ways, especially as much as possible, wherein these different geometrical configurations can be monitored by the position and shape providing unit 12 and the monitored geometrical configurations can be used by the configuration information providing unit 34 for determining the configuration information. The configuration information providing unit 34 may be adapted to determine the monitored geometrical configurations as the possible configurations. The configuration information providing unit 34 can also be adapted to determine additional possible configurations based on the monitored geometrical configurations, for instance, by interpolating between the monitored geometrical configurations.

The interventional system 1 further comprises a path determination unit 30 for determining a possible path for the interventional instrument, which allows the interventional instrument 10 to reach the target 45, based on the current position and shape of the interventional instrument 10, the target position and the possible configurations of the interventional instrument 10. The determined possible path is then shown on the display 33. For determining the possible path known optimization algorithms can be used. The optimization algorithms can use an objective function which depends on the distance between the interventional instrument, after is has been moved as defined by the possible path, and the target, wherein the optimization algorithms can be adapted to determine the possible path, especially iteratively, such that the objective function is optimized under consideration of the provided current position and shape of the interventional instrument, the provided target position and the configuration information. The optimization algorithms can consider further information like anatomical information and/or interventional procedure constraints as will be explained further below.

The interventional system 1 can further comprise an anatomical information providing unit 48 for providing anatomical information being indicative of the anatomy within the subject 7 at least between the current position of the interventional instrument 10 as defined by its current position and shape and the target position. The anatomical information may be provided as a three-dimensional image or a three-dimensional model of the anatomy, for instance, of the heart 8 of the person 7. In particular, a non-person-specific heart model may be provided, wherein this heart model may be made person-specific by adapting the heart model such that it corresponds to two-dimensional x-ray projection images of the heart generated by the x-ray C-arm system 2. For instance, the heart model can be adapted such that calculated forward projections simulating the acquisition of the two-dimensional x-ray projection images match as much as possible the acquired two-dimension x-ray projection images.

The intentional system 1 can further comprise an interventional procedure constraints providing unit 49 for providing interventional procedure constraints to be considered while moving the interventional instrument 10 during performing the interventional procedure. The interventional procedure constraints can define, for instance, under which angle the interventional instrument 10 should approach the target. Also other interventional procedure constraints can be defined like a required minimal distance to anatomical parts of the subject.

The path determination unit 30 can be adapted to determine the possible path also based on the provided anatomical information and/or based on the provided interventional procedure constraints. The path determination unit 30 can also be adapted to determine a possible path, which allows the interventional instrument 10 to reach a position being as close as possible to the target, based on the current position and shape of the interventional instrument 10, the target position, the possible configurations of the interventional instrument 10 and optionally also based on the provided anatomical information and/or the provided interventional procedure constraints, if a possible path, which allows the interventional instrument 10 to reach the target, is not determinable.

The interventional procedure constraints can also define that the interventional instrument needs to pass one or several specific locations before reaching the target, which may be predefined or which may be defined during the interventional procedure. For instance, in case of a percutaneous mitral valve repair procedure the interventional procedure constraints can define that the interventional instrument 10 has to pass through a puncture location 41 in the interatrial septum 42 such that the path determination unit 30 needs to determine the possible path such that a part of the interventional instrument 10 is arranged at the puncture location 41 while the distal tip of the interventional instrument 10 is arranged at the target position as schematically and exemplarily illustrated in FIG. 2, wherein for the determination of the possible path the puncture location 41, the target position and the possible configurations of the interventional instrument 10 are considered. In this embodiment it might be possible to determine the possible path without considering the anatomical information, because it can be assumed that the left atrium 43 is large enough such that the interventional instrument 10 can be freely moved between the puncture location 41 and the target 45.

Since the position and shape providing unit 12, the target position providing unit 29, the configuration information providing unit 34, the anatomical element indicator providing unit 44, the image providing unit 2, the interventional procedure indicator providing unit 46, the anatomical information providing unit 48, the interventional procedure constraints providing unit 49 and the display 33 are used for determining and displaying a possible path, which allows the interventional instrument 10 to reach the target, wherein this possible path assists a physician in navigating the interventional instrument 10 within the person 7, especially within the heart 8 of the person 7, to the target, these components can be regarded as being components of a navigation assistance system for assisting in navigating the interventional instrument 10 within the person 7 during an interventional procedure.

Figure 3:
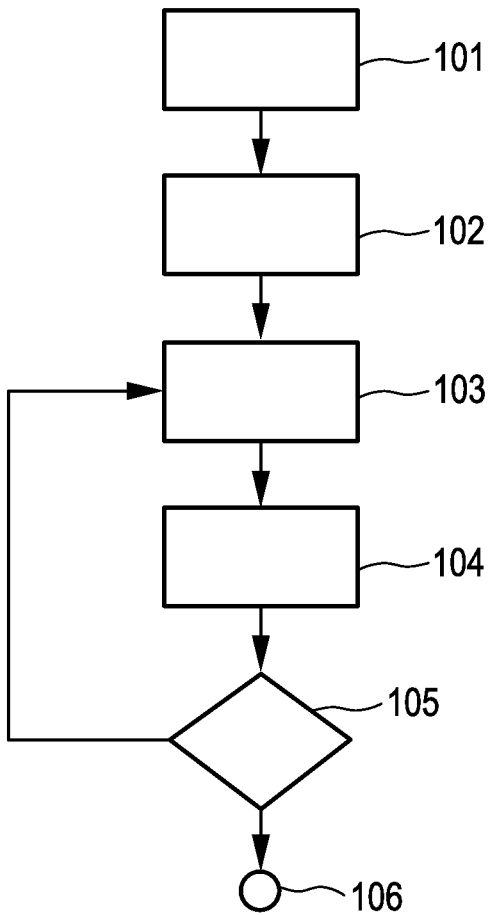
FIG. 3 shows a flowchart exemplarily illustrating an embodiment of a navigation assistance method for assisting in navigating an interventional instrument within a subject during an interventional procedure.

In the following an embodiment of a navigation assistance method for assisting in navigating the interventional instrument 10 within the person 7 during the interventional procedure will exemplarily be described with reference to a flowchart shown in FIG. 3.

In step 101 a target position is provided by the target position providing unit 29, wherein the target position defines the position of the target 45 to which the interventional instrument 10 is to be moved. Moreover, configuration information being indicative of possible configurations of the interventional instrument 10 is provided by the configuration information providing unit 34. Optionally, the anatomical information providing unit 48 may provide anatomical information being indicative of the anatomy within the person 7 and/or the interventional procedure constraints providing unit 49 may provide interventional procedure constraints to be considered while moving the interventional instrument 10 during performing the interventional procedure.

In step 102 the current position and shape of the interventional instrument 10 is provided by the position and shape providing unit 12 and in step 103 a possible path, which allows the interventional instrument 10 reach the target 45, is determined based on the current position and shape of the interventional instrument 10, the target position, the possible configurations of the interventional instrument 10 and optionally also based on the anatomical information and/or the interventional procedure constraints. In step 104 the determined possible path is shown on the display 33. Preferentially, also the target position is shown on the display 33. In addition, anatomical information may be shown on the display 33, wherein this anatomical information may be the anatomical information provided by the anatomical information providing unit 48 or other anatomical information. The anatomical information may be an image or a model of the heart such that the determined possible path can be visualized on the display 33 relative to the anatomy of, for instance, the heart.

In step 105 it is determined whether an abort criterion is fulfilled. This abort criterion may be whether a user has input into the interventional system 1, especially into the navigation assistance system, that the navigation assistance method should be stopped. The user may indicate that the navigation assistance method should be stopped via an input unit 32 being, for instance, a keyboard, a computer mouse, a touch pad, a foot switch, a button to be actuated by hand, et cetera. If the abort criterion is fulfilled, the navigation assistance method ends in step 106. Otherwise the navigation assistance method continues with step 103. Thus, the current position and shape of the interventional instrument 10 is continuously monitored, the possible path is continuously determined based on the respective current position and shape of the interventional instrument 10 and the displaying of the possible path is continuously updated, until an abort criterion is fulfilled, in order to provide realtime possible paths, while the position and/or shape of the interventional instrument 10 is changed.

The above described x-ray-guided minimally invasive procedure enables save operations on patients that are denied surgery due to intraoperative risks. Due to the transcatheter nature, the intervention limits the access paths that the physician, which might be a cardiologist, can follow. Interventional instruments like catheters usually have only a few degrees of freedom; therefore paths, which can be used by the interventional instruments which may also be regarded as being surgical tools, are basically constrained by the path it has already followed and the anatomy lying forward. Sometime the anatomy provides a great deal of constraints on the possibilities of progress of the interventional instrument. Especially the vascular structure may provide strong constraints. However, when no constrain is to be expected from the anatomy such as within cardiac chambers, the possibilities of future paths are basically given by the current path, which is determined by past decisions of the physician, and the degrees of freedom of the interventional instrument. The degrees of freedom can be defined by the configuration information being indicative of the possible configurations of the interventional instrument.

Without the navigation assistance system and method described above with reference to FIGS. 1 to 3, in moments when the physician has to make path decisions only the physician's expertise provides help in forecasting possible future paths guaranteeing safe reach of the target. For instance, during percutaneous mitral valve repair procedures, especially during percutaneous edge-to-edge mitral clip repair procedures, the physician has to decide at which location the interatrial septum should be punctured. This puncture location has to be at the right place, in order to allow the interventional instrument, especially the catheter, to turn and reach the mitral valve safely in the atrium.

The navigation assistance system and method described above with reference to FIGS. 1 to 3 therefore provides a guidance by providing instant visual feedback on future possible paths for the interventional instrument, which may be shown starting from the current three-dimensional position and shape of the interventional instrument as preferentially measured by optical shape sensing. For instance, possible future paths of the interventional instrument are visualized based on prior knowledge about the interventional instrument and about the interventional procedure, i.e., for example, based on the configuration information being indicative of possible configurations of the interventional instrument and interventional procedure constraints information.

The configuration information unit being indicative of possible configurations of the interventional instrument can also be regarded as being the specification of the interventional instrument and it preferentially defines its geometric properties and the range of possible configurations its degrees of freedom allow it to reach. For example, in the case of a mitral valve repair procedure the catheter 10 may bear a clip device 55 for repairing the mitral valve and may have a characteristic geometry with a sharp bend followed by a straight part till the distal tip of the catheter as schematically and exemplarily illustrated in FIG. 2. Without the navigation assistance system and method, only strong expertise allows the physician to forecast which puncture location for a septal puncture will allow the physician to place the clip device 55 with a correct incidence angle relative to the mitral valve 45.

If possible configurations of the interventional instrument, especially the space of possible shapes of the interventional instrument, are not known by, for example, prior measurements, they can be inferred from shapes measured by optical shape sensing. This can be performed implicitly by recording movements of the interventional instrument caused by the physician especially during an interventional procedure and by inferring the degrees of freedom as well as the geometric span, i.e., for instance, the maximum curvature. This can also be performed explicitly by asking the physician or another user to undergo a measurement step where degrees of freedom of the interventional instrument are individually activated prior to the determination of the possible path and the path visualization, particularly prior to the interventional procedure. Those inference techniques can be particularly useful to determine online the configuration information for a certain interventional instrument which is used together with other interventional instruments which influence the configuration information. For instance, for determining the configuration information of a catheter, which is used together with a guidewire and/or a sheath, wherein the catheter and the guidewire and/or the sheath may even be inserted into each other, the physician may be asked to manipulate the catheter and the different positions and/or shapes of the catheter may be recorded and used for determining the configuration information. The positions and/or shapes of the catheter may also be recorded during the progress of the interventional procedure, without explicitly requesting the physician to manipulate the catheter for determining the configuration information, wherein also in this case the recorded positions and/or shapes may be used for determining the configuration information.

By considering the target position one or several relevant paths among the space of all possible paths from the current position and shape of the interventional instrument can be presented. The target position can be provided automatically based on prior knowledge of the type of procedure, which may be provided by the interventional procedure indicator providing unit, and possibly extra information extracted from images provided by the image providing unit like x-ray projection images and/or ultrasound images, wherein these images may, for instance, show the cavities of the heart. The target position may also be provided manually by the physician by allowing the physician to position markers in a two-dimensional or three-dimensional image and/or a two-dimensional or three-dimensional model modeling the anatomy of the person. The provided target position can be a position of a point or of an area defining the target. The target position can include a location and optionally also an orientation of the target, especially if the angle of incidence of the interventional instrument with respect to the target is important.

Based on the possible configurations of the interventional instrument, the target position and the three-dimensional position and shape of the interventional instrument, which may be known by optical shape sensing, possible paths of the interventional instrument can be computed and dynamically displayed on screen to help the physician in weighting different options and to allow the physician to make informed decisions. One of these decisions might be at which location the interatrial septum should be crossed during a percutaneous edge-to-edge mitral valve repair procedure. The location of the crossing, i.e. the puncture location, has to be chosen wisely to enable a safe positioning of the distal tip of the interventional instrument, especially of the clip device located at the distal tip of the interventional instrument, orthogonal to the mitral valve without hurting the atrial walls. The navigation assistance system and method can be adapted to show one possible path or a range of possible paths from the current position of the interventional instrument to the target as schematically and exemplarily illustrated in FIG. 4 or as close as possible to the target.

Figure 4:
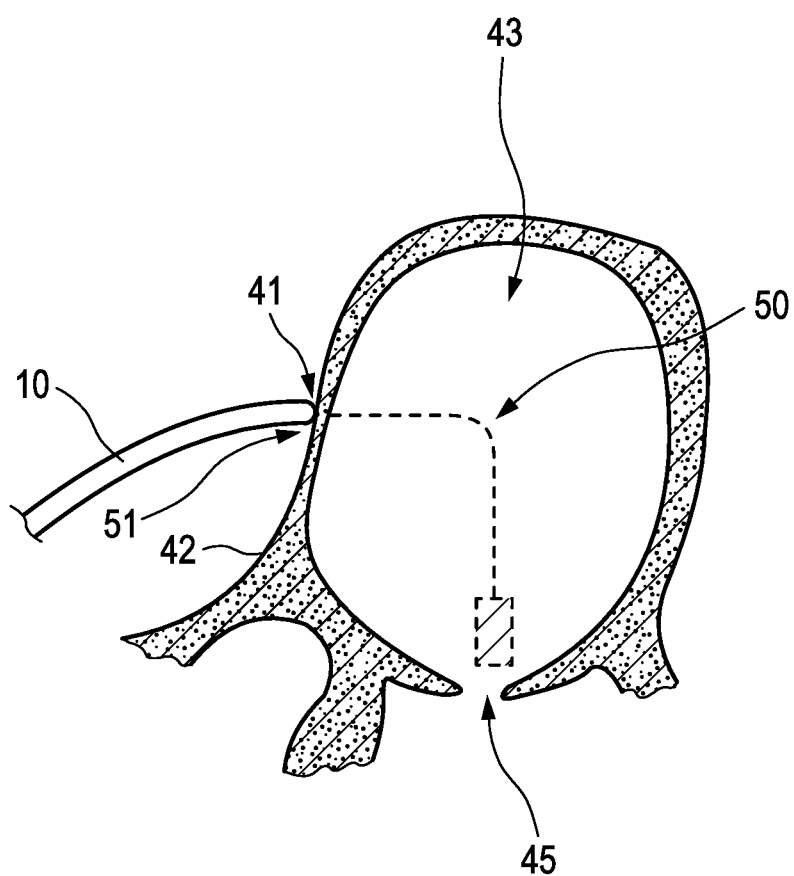
FIG. 4 illustrates schematically and exemplarily a determined possible path for the interventional instrument, which allows the interventional instrument to reach a target.

FIG. 4 shows the distal tip 51 of the interventional instrument 10 being, in this example, a catheter at a location 41 on the interatrial wall 42. Based on, inter alia, the current position and shape of the interventional instrument 10 and hence also on the current location 41 of the distal tip 51 at the interatrial wall 42, a possible path 50 is determined and displayed, which allows the interventional instrument 10 to orthogonally reach the target 45 being, in this embodiment, the mitral valve within the left atrium 43. As the physician repositions the interventional instrument 10 such that the distal tip 51 is arranged at another location on the interatrial wall 42, a new possible path is determined and shown to the physician, in order to allow the physician to decide whether the interatrial wall 42 should be punctured at the current location of the distal tip 51 of the interventional instrument 10 or whether the distal tip 51 should be moved to another location on the interatrial wall 42, which may be more suited.

Although in above described embodiments the interventional procedure is a mitral valve repair procedure, the navigation assistance system and method can also be used for assisting and navigating an interventional instrument within a subject during another interventional procedure, for instance, during an electrophysiological procedure.

Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality.

A single unit or devices may fulfill the functions of several items recited in the claims. The mere fact that certain measures are recited in mutually different dependent claims does not indicate that a combination of these measures cannot be used to advantage.

Procedures like the provision of the current position and shape of the interventional instrument, the provision of the target position, the provision of the configuration information, the provision of the anatomical information, the provision of the interventional procedure constraints information, the determination of the possible path, et cetera performed by one or several units or devices can be performed by any other number units or devices. These procedures and/or the control of the navigation assistance system in accordance with the navigation assistance method can be implemented as program code means of a computer program and/or as dedicated hardware.

A computer program may be stored/distributed on a suitable medium, such as an optical storage medium or a solid-state medium, supplied together with or as part of other hardware, but may also be distributed in other forms, such as via the Internet or other wired or wireless telecommunication systems.

Any reference signs in the claims should not be construed as limiting the scope.

The invention relates to a navigation assistance system for assisting in navigating an interventional instrument within a subject during an interventional procedure. Based on a provided current position and shape of the interventional instrument, a provided target position defining the position of a target to which the interventional instrument is to be moved and provided configuration information being indicative of possible configurations of the interventional instrument a possible path is determined, which allows the interventional instrument to reach the target. The determined possible path and preferentially also the current position and shape of the interventional instrument and the target position can be shown on a display in realtime, while a physician moves the interventional instrument, thereby assisting the physician in navigating the interventional instrument.

The invention claimed is:

1. A navigation assistance system for assisting in navigating an interventional instrument within a subject during an interventional procedure, the navigation assistance system comprising
a light source and a light detector to provide a current position and a shape of the interventional instrument,
a processor and a tangible, non-transitory computer readable medium for storing instructions that, when executed by the processor, cause the processor to:
provide a target position defining a position of a target to which the interventional instrument is to be moved;
provide configuration information being indicative of possible configurations of the interventional instrument based on constraints of the interventional instrument, and to determine the configuration information based on current positions and shapes of the interventional instrument, which are provided by the light source and to the light detector when the interventional instrument is moved, and to provide the configuration information;
determine a possible path for the interventional instrument, which allows the interventional instrument to reach the target, based on the current position and shape of the interventional instrument, the target position and the configuration information; and
a display for displaying the possible path.

2. The navigation assistance system as defined in claim 1, wherein the instructions further cause the processor to provide the current position and shape by optical shape sensing.

3. The navigation assistance system as defined in claim 1, wherein the instructions further cause the processor to provide an anatomical element indicator indicating an anatomical element and an image providing unit for providing an image of the subject showing the anatomical element; and to determine the target position based on the anatomical element indicator and the image and to provide the target position.

4. The navigation assistance system as defined in claim 3, wherein the instructions further cause the processor to provide an interventional procedure indicator indicating the interventional procedure to be performed; to provide assignments between interventional procedure indicators and anatomical element indicators indicating anatomical elements; and to determine the anatomical element indicator based on the interventional procedure indicator and the assignments and to provide the anatomical element indicator.

5. The navigation assistance system as defined in claim 1, wherein instructions further cause the processor to allow a user to input the target position and to provide the target position input by the user.

6. The navigation assistance system as defined in claim 1, wherein the instructions further cause the processor to provide anatomical information being indicative of anatomy within the subject; and to determine the possible path also based on the anatomical information.

7. The navigation assistance system as defined in claim 1, wherein the instructions further cause the processor to provide interventional procedure constraints to be considered while moving the interventional instrument during performing the interventional procedure; and to determine the possible path also based on the interventional procedure constraints.

8. The navigation assistance system as defined in claim 1, wherein instructions further cause the processor to determine a possible path, which allows the interventional instrument to reach a desired position, based on the current position and shape of the interventional instrument, the target position and the possible configurations of the interventional instrument, if a possible path, which allows the interventional instrument to reach the target, is not determinable.

9. The navigation assistance system as defined in claim 1, wherein the navigation assistance system is adapted to perform a percutaneous mitral valve repair procedure, wherein the instructions further cause the processor to provide the position of the mitral valve as the target position.

10. The navigation assistance system as defined in claim 9, wherein the percutaneous mitral valve repair procedure comprises puncturing an interatrial septum at a puncture location, in order to allow the interventional instrument to be introduced into a left atrium of a heart of the subject, wherein the instructions further cause the processor to determine a possible path for reaching the mitral valve, when a distal tip of the interventional instrument is located at a location on the interatrial septum, at which the interatrial septum is intended to be punctured.

11. The navigation assistance system as defined in claim 1, wherein the instructions further cause the processor to provide anatomical information being indicative of anatomy within the subject; and to determine the possible path also based on the anatomical information.

12. An interventional system for performing an interventional procedure, the interventional system comprising:
an interventional instrument,
a navigation assistance system for assisting in navigating the interventional instrument within a subject during the interventional procedure, the navigational assistance system comprising:
a light source and a light detector to provide a current position and a shape of the interventional instrument;
a processor and a non-transitory computer-readable medium for storing instructions which, when executed by the processor, cause the processor to: provide a target position defining a position of a target to which the interventional instrument is to be moved; provide configuration information being indicative of possible configurations of the interventional instrument based on constraints of the interventional instrument, and to determine the configuration information based on current positions and shapes of the interventional instrument, which are provided by the light source and to the light detector when the interventional instrument is moved, and to provide the configuration information; determine a possible path for the interventional instrument, which allows the interventional instrument to reach the target, based on the current position and shape of the interventional instrument, the target position and the configuration information; and
a display for displaying the possible path.

13. The interventional system as defined in claim 12, wherein the instructions further cause the processor to provide the current position and shape by optical shape sensing.

14. The interventional system as defined in claim 12, wherein the instructions further cause the processor to provide an anatomical element indicator indicating an anatomical element and an image providing unit for providing an image of the subject showing the anatomical element; and to determine the target position based on the anatomical element indicator and the image and to provide the target position.

15. The interventional system as defined in claim 14, wherein the instructions further cause the processor to provide an interventional procedure indicator indicating the interventional procedure to be performed; to provide assignments between interventional procedure indicators and anatomical element indicators indicating anatomical elements; and to determine the anatomical element indicator based on the interventional procedure indicator and the assignments and to provide the anatomical element indicator.

16. The interventional system as defined in claim 12, wherein instructions further cause the processor to allow a user to input the target position and to provide the target position input by the user.

17. The tangible, non-transitory computer readable medium as defined in claim 12, comprising further instructions, which when executed by the processor cause the processor to provide the current position and shape by optical shape sensing.

18. The tangible, non-transitory computer readable medium as defined in claim 12, comprising further instructions, which when executed by the processor cause the processor to provide an anatomical element indicator indicating an anatomical element and an image providing unit for providing an image of the subject showing the anatomical element; and to determine the target position based on the anatomical element indicator and the image and to provide the target position.

19. The tangible, non-transitory computer readable medium defined in claim 18, comprising further instructions, which when executed by the processor cause the processor to provide an interventional procedure indicator indicating the interventional procedure to be performed; to provide assignments between interventional procedure indicators and anatomical element indicators indicating anatomical elements; and to determine the anatomical element indicator based on the interventional procedure indicator and the assignments and to provide the anatomical element indicator.

20. A tangible, non-transitory computer readable medium that stores instructions, which when executed by a processor cause the processor to:
provide a target position defining a position of a target to which an interventional instrument is to be moved;
provide configuration information being indicative of possible configurations of the interventional instrument based on constraints of the interventional instrument, and to determine the configuration information based on current positions and shapes of the interventional instrument, which are provided by a light source and a light detector when the interventional instrument is moved, and to provide the configuration information;
determine a possible path for the interventional instrument, which allows the interventional instrument to reach the target, based on the current position and shape of the interventional instrument, the target position and the configuration information; and
display the determined possible path.

* * * * *